US005991178A

United States Patent [19]

Arnould

[11] Patent Number: 5,991,178

[45] Date of Patent: Nov. 23, 1999

[54] VHV TRANSFORMER/RECTIFIER FOR SURFACE MOUNTING

[75] Inventor: Guy Arnould, Bonnelles, France

[73] Assignee: Thomson-CSF, Paris, France

[21] Appl. No.: 09/051,478

[22] PCT Filed: Aug. 19, 1997

[86] PCT No.: PCT/FR97/01500

§ 371 Date: Apr. 17, 1998

§ 102(e) Date: Apr. 17, 1998

[87] PCT Pub. No.: WO98/08237

PCT Pub. Date: Feb. 26, 1998

[30] Foreign Application Priority Data

Aug. 20, 1996 [FR] France ..................................... 96 10304

[51] Int. Cl.[6] ..................................................... H02M 7/10

[52] U.S. Cl. ............................. 363/68; 363/126; 363/144

[58] Field of Search ................................ 363/67, 68, 126, 363/141, 144

[56] References Cited

U.S. PATENT DOCUMENTS

| | | | |
|---|---|---|---|
| 4,024,449 | 5/1977 | Burrie et al. | 363/50 |
| 4,545,005 | 10/1985 | Mudde | 363/68 |
| 4,807,105 | 2/1989 | Varjasi et al. | 363/126 |
| 5,023,768 | 6/1991 | Collier | 363/68 |
| 5,166,965 | 11/1992 | Collier | 363/68 |
| 5,225,803 | 7/1993 | Negle et al. | 336/208 |
| 5,631,815 | 5/1997 | Cross | 363/68 |
| 5,774,349 | 6/1998 | Tichy et al. | 363/126 |
| 5,835,367 | 11/1998 | Pan et al. | 363/68 |

FOREIGN PATENT DOCUMENTS

| | | | |
|---|---|---|---|
| 0084912 | 8/1983 | European Pat. Off. | H05G 1/12 |
| 0354121 | 2/1990 | European Pat. Off. | H01F 27/06 |
| 0464924 | 1/1992 | European Pat. Off. | H01F 31/08 |

*Primary Examiner*—Jeffrey Sterrett
*Attorney, Agent, or Firm*—Oblon, Spivak, McClelland, Maier & Neustadt, P.C.

[57] ABSTRACT

A miniaturized VHV transformer/rectifier for surface mounting on a screen-printed ceramic substrate. The primary winding and secondary windings are wound on separate limbs of the magnetic circuit which are sufficiently far apart to obtain a considerable leakage self-inductance. The secondary winding is formed by a stack of pancake coils each including a respective winding and the associated diode bridge along with their respective connections. The primary is cemented to a ceramic interface plate which is metallized on its rim to make a transfer plate coinciding with the surface of the receiving substrate.

9 Claims, 4 Drawing Sheets

VHV TRANSFORMER/RECTIFIER FOR SURFACE MOUNTING

BACKGROUND OF THE INVENTION

1. Field of the Invention

The present invention relates to a miniaturized VHV (Very High Voltage) transformer/rectifier for surface mounting on a screen-printed ceramic substrate.

2. Discussion of the Background

A specific example of an environment in which a VHV transformer/rectifier according to the invention is typically incorporated is represented in the electrical diagram of the attached FIG. 1.

This FIG. 1 concerns a dc step-up voltage converter which, for a dc input voltage VE which is typically a few hundred volts, delivers a dc output voltage Vs which is for example of the order of a few kilovolts.

This circuit includes a chopper 1, in itself very conventional, which includes four static switches of the MOS transistor type, labelled 2 to 5, mounted as a bridge whose input diagonal is supplied with the dc input voltage VE as represented. The four transistors 2, 3, 4, 5 are turned on respectively by the recurrent pulsed signal trains Q1, Q2, $\overline{Q1}$, $\overline{Q2}$, the signal trains Q1 and Q2 being offset from one another as represented in the attached FIGS. 2A and 2B, and having a high frequency, for example of the order of a few hundred kilohertz.

As a result, on the output diagonal of this bridge, there is a voltage Vp, represented in FIG. 2C, which is made up of a string of relatively short pulses (of width equal to the offset between the pulse trains Q1 and Q2), which are spaced apart and are alternately positive and negative.

To obtain a rectified voltage Vs of absolute value of much greater amplitude (or "VHV") than that of the voltage Vp, use is made of a transformer/rectifier 6 which includes a low-voltage primary winding 7 and a plurality of secondary windings N1, N2, N3, . . . , Nn. Each of these secondary windings supplies a respective diode bridge P1, P2, P3, . . . Pn, the rectified outputs of this plurality of bridges being connected in series as represented in order to obtain the output voltage Vs.

Present-day techniques for constructing transformers do not allow them to be miniaturized without reducing the power which they transmit, on account of problems with the cooling of these transformers.

SUMMARY OF THE INVENTION

The subject of the present invention is a transformer/rectifier, in particular a VHV transformer/rectifier, for surface mounting, which can be miniaturized to the greatest possible extent, while being capable of transmitting a markedly greater power than a conventional transformer of the same volume (or else which is markedly smaller than a conventional transformer of the same power.

In accordance with a characteristic of the invention, a series inductance L of high value is connected in series between the bridge chopper 1 and the transformer 6. In this way, the current Ip, represented in FIG. 2D, which is delivered by the chopper 1 to the primary 7 of the transformer is a sawtooth current, which is alternately positive and negative, the positive half-cycles being symmetric with the negative half-cycles. The transformer 6 consequently operates as a current transformer rather than as a voltage transformer.

The invention proposes to incorporate into a single unit 8 not only the transformer/rectifier 6, hence including the diode bridges P1 to Pn, but also the high series inductance L, this unit 8, surrounded by a dashed line in FIG. 1, moreover being miniaturized and, around an opening made in this plate, the various plates being arranged one beside the other, the magnetic circuit passing through their openings, rectifiers being arranged or formed on each support and linked to the corresponding coil, the directions of coiling being alternated from one plate to the next.

This alternation allows for the simple placing in series of pancake coils directly via the substrate on which they are mounted, this substrate also providing the thermal interconnection between the transformer and an appropriate heat sink, on account of the fact that this substrate can have excellent thermal conduction properties.

BRIEF DESCRIPTION OF THE DRAWINGS

The present invention will be better understood on reading the detailed description of an embodiment, taken by way of non-limiting example and illustrated by the appended drawing in which.

DISCUSSION OF THE PREFERRED EMBODIMENTS

Figure 1:
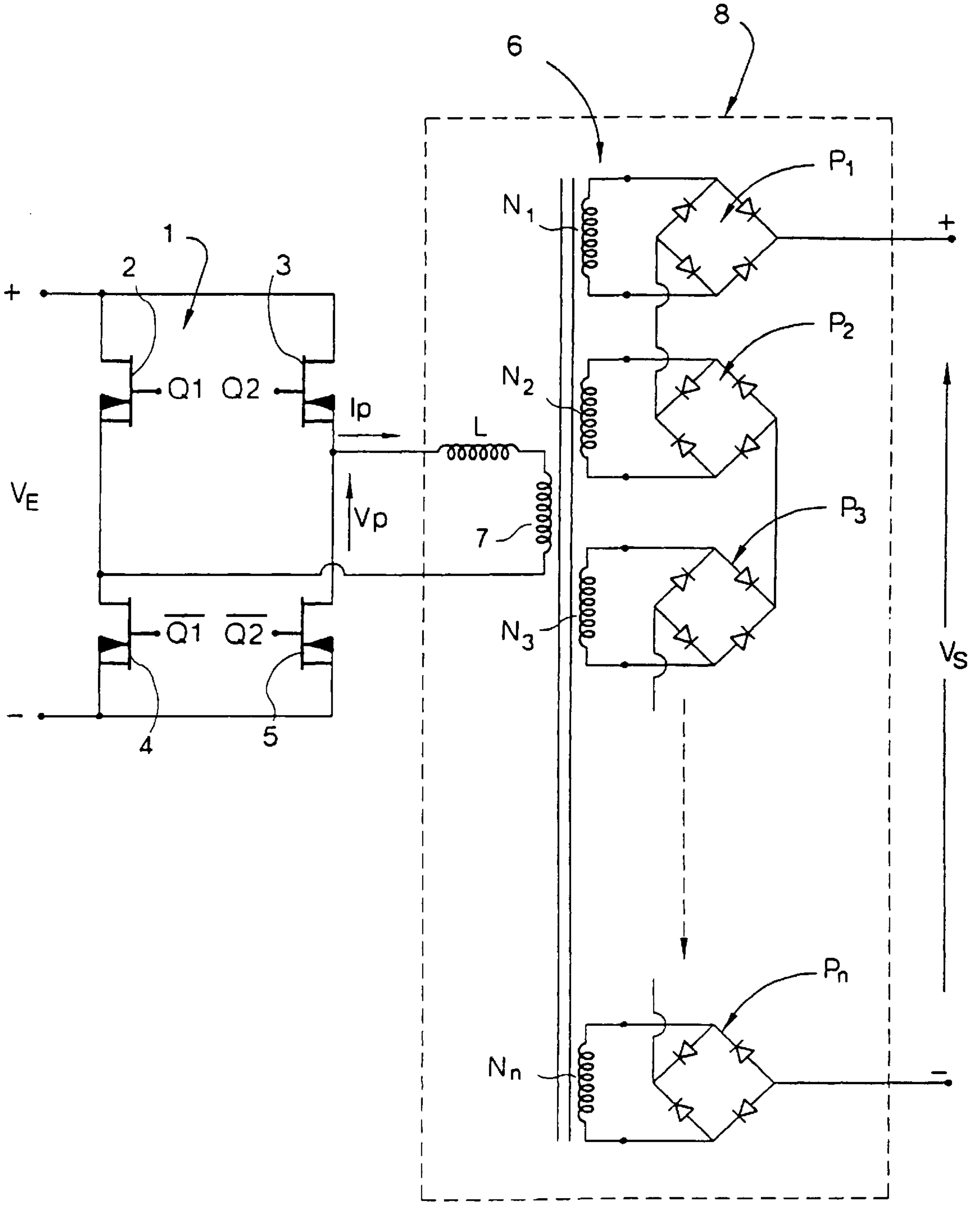
FIGS. 1 and 2A to 2*d*, mentioned above, are respectively an electrical diagram of a converter and waveforms recorded from this converter.
Figure 2A:
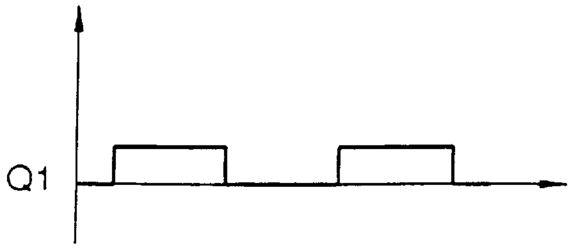
Figure 2B:
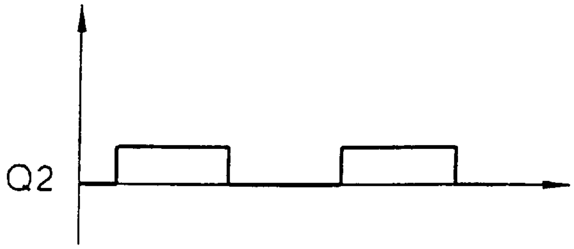
Figure 2C:
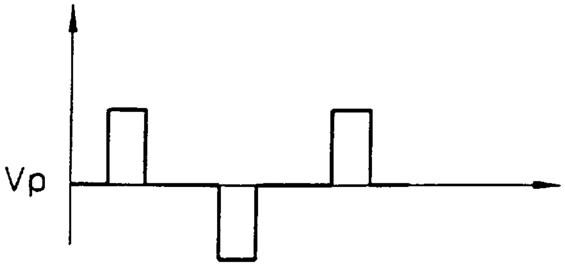
Figure 2D:
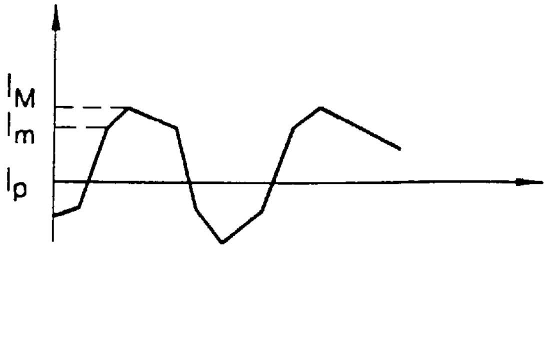

Referring to the collection of FIGS. 3 to 7, these deal with the construction of the assembly denoted by the label 8 in the diagram described earlier with reference to FIG. 1.

This assembly comprises the transformer/rectifier 6, with its primary winding 7 which is for example a single winding, its multiple secondary windings N1 to Nn, and its diode bridges P1 to Pn, and it furthermore comprises the series self-inductance L which is an important element of the set-up. In accordance with one aspect of the invention, the technology for constructing this transformer/rectifier is devised in such a way that the self-inductance L consists of the leakage inductance, referred back to the primary, of the windings of this transformer. This is achieved, as will be seen later, in particular by distancing the primary and the secondary of the transformer from each other so as to favour the losses to the maximum instead of seeking to avoid them, as is ordinarily done.

Thus, a series self-inductance which, if it had to be provided as a separate component, would have substantially the same size as the transformer itself, is replaced by a leakage inductance which is not a physical component and which does not in itself occupy any space. Furthermore, in order to have a sufficiently high value of inductance, this separate component would necessarily be a magnetic-core inductor, so that it would then produce, for overly high currents, a conventional phenomenon of saturation of this magnetic core. For these high currents, the value of the inductance of this separate component would then drop abruptly, so that the set-up would then no longer operate. Such is not the case with the transformer of the invention since the inductance L is a leakage inductance equivalent to an air-coil inductor and hence unaware of the aforementioned saturation phenomenon.

Furthermore, this technology is such that it enables this assembly 8 to be constructed in a sufficiently miniaturized form as to be capable, like other components such as "chip" components, of being surface-mounted on a screen-printed insulating substrate, that is to say a ceramic substrate, for example made of alumina, which is simultaneously a good thermal conductor and a good electrical insulator. In order to do this, as shall be seen, this transformer/rectifier is designed for optimal removal of heat, this being simultaneously favourable to its miniaturization and to its capacity for being surface mounted.

The magnetic circuit of this transformer is (FIG. 3) a closed magnetic circuit which is made up for example of four bars or limbs, arranged as represented to form the four sides of a rectangle:

- a limb 9 about which the primary winding 7 of the transformer is wound,
- a limb 10, opposite and therefore parallel to the limb 9, which receives a stack 11 of pancake coils G1 to G8 which each contain a secondary winding N1 to N8 and a corresponding diode bridge P1 to P8 (FIG. 1), together with their respective connection facilities (linking conductors, etc.),
- two limbs 12, 13 for closing the magnetic circuit which are respectively bordered externally by respective metal plates 14, 15 intended for the thermal removal of the heat generated in these two limbs 12, 13.

It should be noted that the entire circuit, including the bridge chopper 1 (FIG. 1) and the circuit (not represented) for regulating the output voltage Vs, is attached to a ceramic substrate 24A which is electrically insulating but a good conductor of heat. Typically, this electrically but not thermally insulating ceramic is alumina. In what follows it will be designated more simply by the term "ceramic".

In accordance with one of the characteristics of the invention, the primary winding 7 is moreover attached, for example by cementing, to an external plate 16, made from the same ceramic as the aforementioned support substrate 24A.

The two end strands 17, 18 of the primary winding 7 pass through this ceramic plate 16 and emerge on its exterior face where they are respectively bonded to two metallized parts 19 and 20 (FIG. 6) which each extend over the rim 21 of the ceramic plate 16.

This rim 21 is itself cemented to the substrate 24A (see FIG. 4), the ceramic plate 16 being orthogonal to the said substrate. The connection, both electrical and thermal, of the primary winding 7 is thus obtained.

It should be noted that, like this plate 16, the aforementioned metal plates 14 and 15 are themselves also positioned orthogonally to the substrate and in such a way that their rim 22, 23 is in the plane 24 of the surface of this substrate, this common plane 24 therefore constituting a plane of assembly for the three plates 14, 15, 16.

Figure 3:
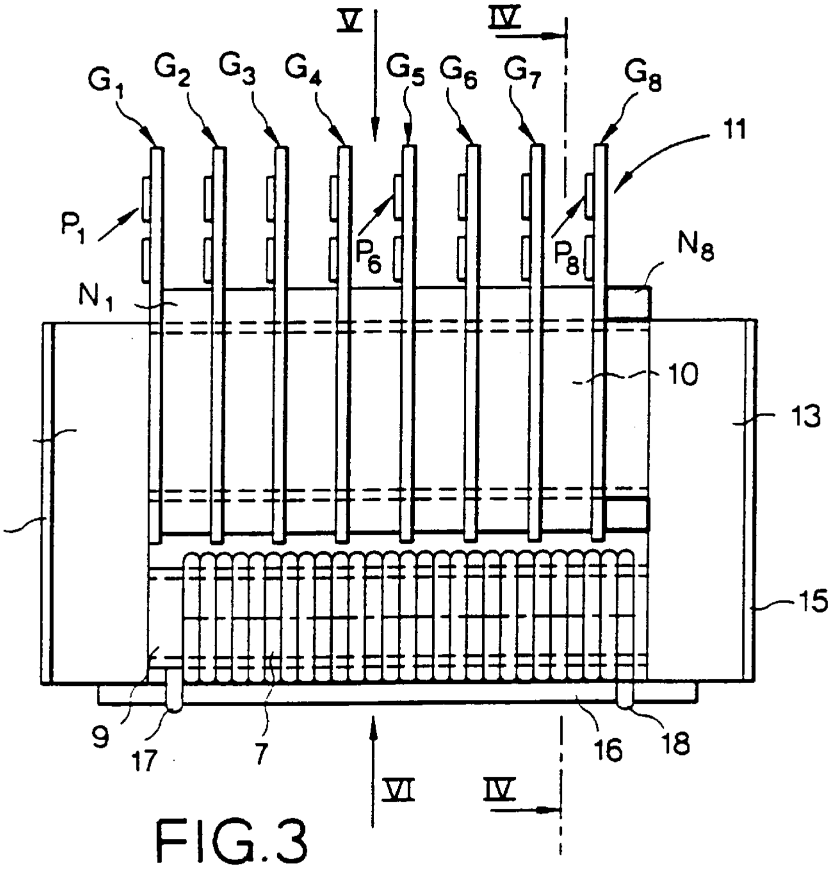
FIG. 3 is a plan view of this transformer/rectifier.

As may be seen in particular in FIG. 3, the metal plates 14 and 15 are orthogonal to the ceramic plate 16, the heat-exchange surfaces thus being maximal on account of the fact that these plates 14, 15 are attached to the largest surface of each limb 12, 13.

Advantageously, these exchange plates 14, 15 are copper plates which are cemented to the edges of the lateral limbs 12 and 13 of the magnetic circuit.

Figure 4:
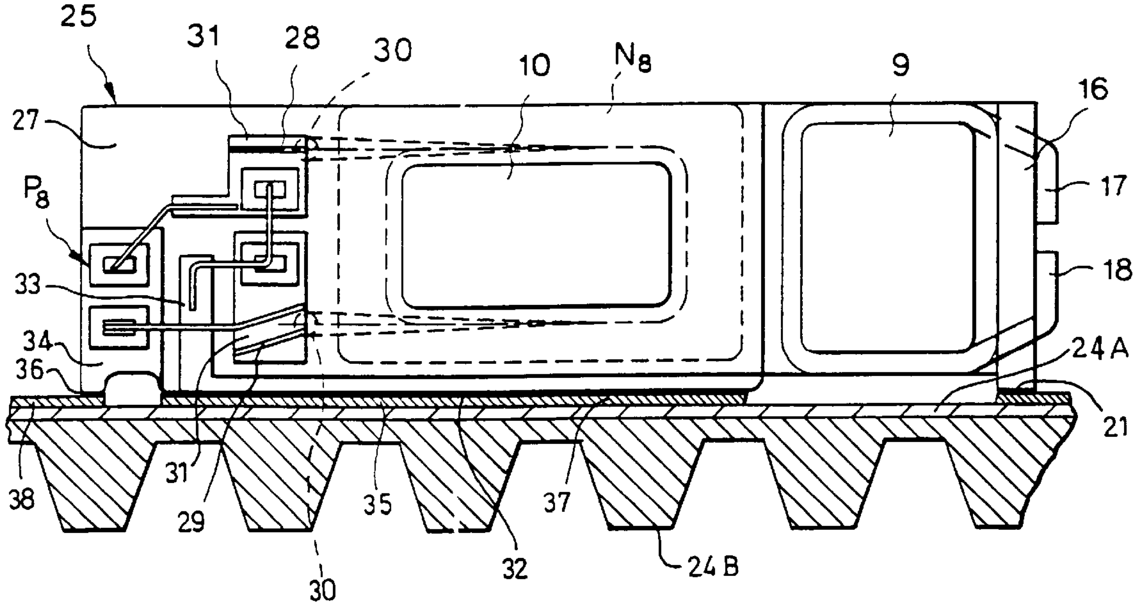
FIG. 4 is a transverse section through the plane IV—IV of FIG. 3.
Figure 5:
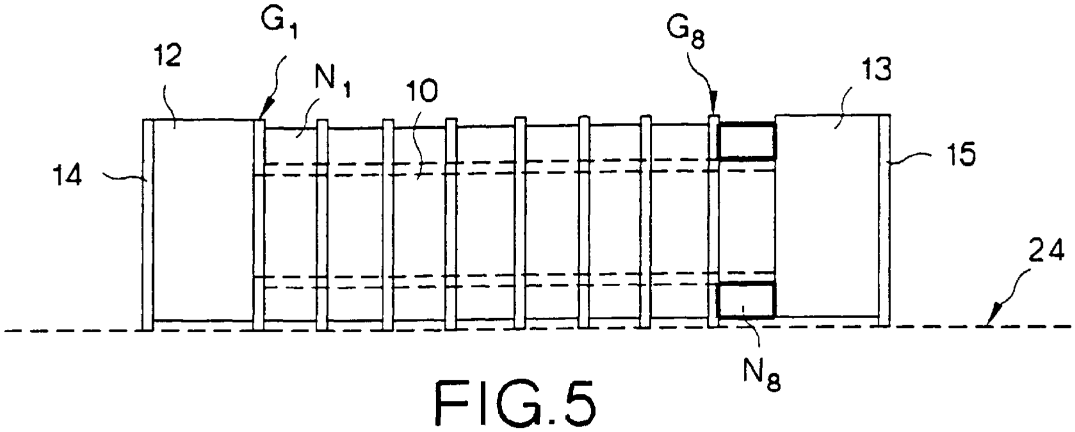
FIG. 5 is a view of the "secondary" side, in the direction V of FIG. 3.
Figure 6:
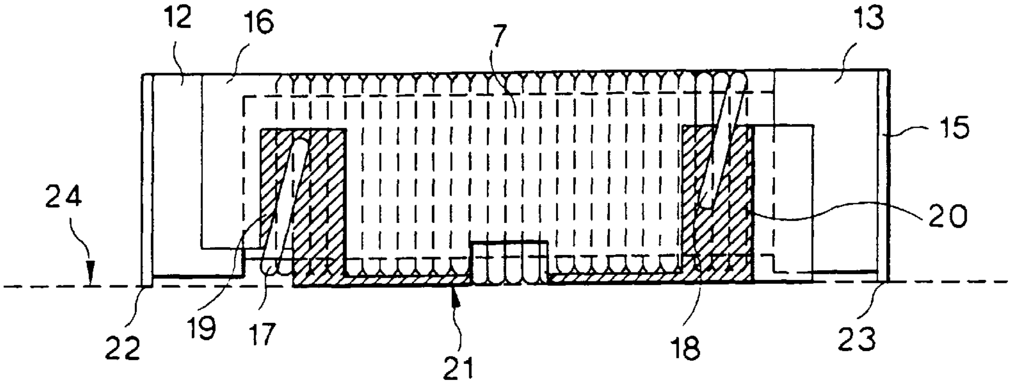
FIG. 6 is a view of the "primary" side in the direction VI of FIG. 3.
Figure 7:
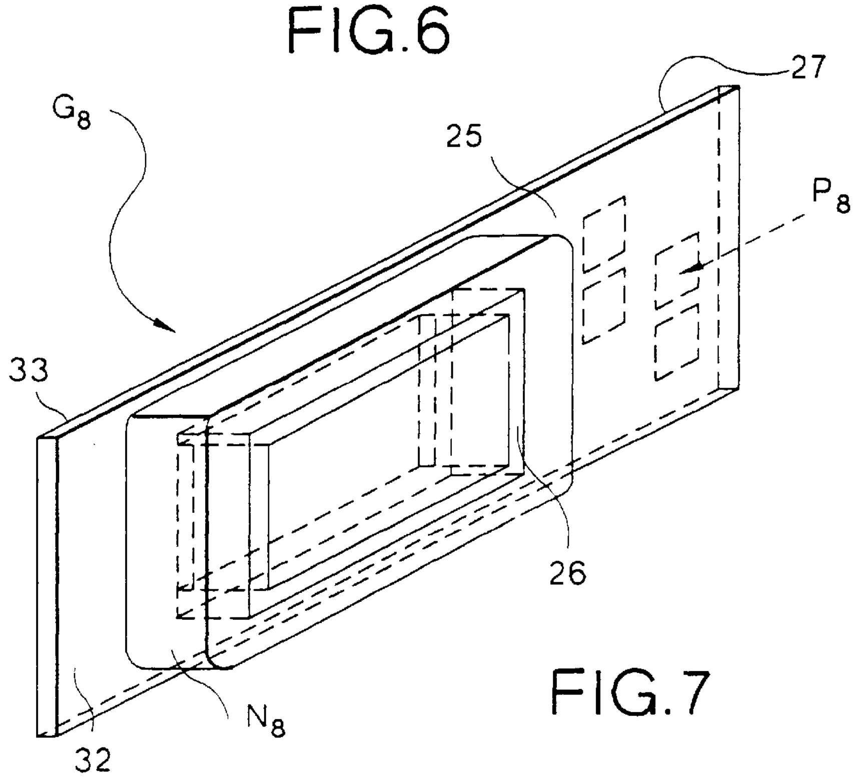
FIG. 7 is a perspective view of one of the stackable pancake coils with which the "secondary" side is equipped.

One of the eight pancake coils, for example G8, which make up the stack 8, is represented in FIG. 7, while the connection facility which it contains is clearly visible in FIG. 4.

The pancake coils is one in which the support plate 25, made from a ceramic of the same type as, preferably identical to, that from which the plate 16 and the substrate are made, and which essentially comprises a coil former 26, of rectangular section, which will tightly clasp the limb 10 of the magnetic circuit, and an exterior lateral extension 27 (see FIG. 4).

One of the secondary windings N1 to N8, for example N8, is wound around the former 26 (or "trough" to use the term of the art). The two end strands 28, 29 (FIG. 4) of this secondary winding N8 pass through the armature 25 via holes 30 and are soldered, on the opposite face of the extension 27 from this winding N8, to metallized elements 31 which form part of the connection facility, attached wholly to this extension 27, relative to the diode bridge P8 associated with this secondary winding N8 and hence wholly attached to this face 27. The outputs of the bridge P8 are linked to metallizations 33, 34 made on the extension 27, these metallizations being linked to corresponding metallizations 35, 36 made on the rim 32 of the plate 25 intended to be fixed to the substrate 24A. The metallizations 35, 36 are soldered to corresponding metallizations 37, 38 formed on the substrate 24A. Thus, by reversing the direction of winding from one pancake coils to the next and by appropriate layouts of the metallizations, in particular the metallizations 37, 38, the secondary windings are easily placed in series, so as to obtain the desired VHV.

It should be noted that the ceramic plate 25 is, like the aforementioned ceramic plate 16, metallized on its rim 32 via which it is stood upright on the aforementioned substrate 24A. In fact, the planes of the eight plates 25 of the stackable elements G1 to G8 are all parallel to one another and parallel to the two copper plates 14 and 15. Their metallized rims 32 all lie in the aforementioned plane 24, which is also the plane of the surface of the substrate for support and for electrical linking of the voltage converter assembly. The substrate 24A is fixed, for example by cementing, to an appropriate heat sink 24B which can advantageously be cooled in a manner known per se, for example by ventilation or by a coolant.

The overall connection facility is such that the diode bridges P1 to P8 are connected in series according to the diagram of FIG. 1.

The fact that the primary winding 7 and secondary windings N1–N8 are respectively wound around limbs 9 and 10, which are physically quite far apart, causes this transformer to have a very considerable leakage self-inductance, of a few tens of microhenries, for example around 40 pH, this leakage self-inductance being, from the electrical point of view, connected in series with the primary winding 7, like the self-inductance L of FIG. 1 which it very advantageously ultimately replaces, as explained earlier. The desired value of this inductance L is set by calculating accordingly the numbers of turns appropriate to the primary and to the secondary of the transformer, whilst of course complying with the desired turns ratios.

A voltage-regulating device which converts the current signal delivered by the unit 8 into a constant voltage is provided, in a manner known per se, in parallel with the output Vs, this unit itself being a current transformer rather than a voltage transformer.

The incorporation of the diode bridges P1 to P8 into the unit 8, furthermore including the transformer and the series self-inductance L, avoids the risks of breakdown at the secondary, and is one of the elements of the invention.

The arrangements in accordance with the invention also have the advantage of allowing miniaturization of the unit 8, this miniaturization being sufficient to favour the surface mounting thereof under widely acceptable conditions, which was not the case with the prior-art devices attempted hitherto.

The dc input voltage VE is typically of the order of 300 volts or of 600 volts, depending on the value of the ac mains voltage from which it arises.

As goes without saying, the invention is not limited to the exemplary embodiment just described.

Thus, for example, other electrically insulating ceramic materials which are nevertheless good thermal conductors, such as the aforementioned alumina, may be used for one and/or other of the aforementioned supports and of the aforementioned ceramic substrate.

Thus, likewise, the thermal plates 14 and 15 may be of a metal other than copper, and each of the closure limbs 12, 13 could be bordered by several plates, and hence on several faces, for example three faces, instead of each being bordered on one face only.

I claim:

1. Compact VHV transformer/rectifier, for surface mounting, comprising a magnetic circuit having a plurality of limbs and over part of the length of which is arranged a primary winding, and over another part of the length of which is arranged at least one secondary winding, in which each secondary winding is arranged on its own support plate, around an opening made in the support plate, the various support plates being arranged one beside another, the magnetic circuit passing through their openings, rectifiers being arranged or formed on each support plate and linked to the corresponding winding, characterized in that the directions of the secondary windings are alternated from one support plate to the next, in that the assembled support plates form a stack of pancake coils which are attached via their metallized rim to a receiving substrate, the outputs of the rectifiers of each pancake coil being linked to metallizations made on the rim of the pancake coils, these metallizations being soldered to corresponding metallizations formed on the receiving substrate, and in that the support plates of the windings and the receiving substrate are made from an electrically insulating material which is a good thermal conductor.

2. Transformer/rectifier according to claim 1, characterized in that the primary winding, which is arranged on a separate limb of the magnetic circuit, is attached to an interface plate made of an electrically insulating material which is a good thermal conductor, this interface plate comprising two metallized electrodes for electrical connection of the two ends of the primary winding and the interface plate being attached via the rim, the rim being metallized to the receiving substrate.

3. Transformer/rectifier according to claim 2, characterized in that the primary winding and all the secondary windings are respectively wound around two opposite limbs of the magnetic circuit.

4. Transformer/rectifier according to claim 1, characterized in that the primary winding and all the secondary windings are respectively wound around two opposite limbs of the said magnetic circuit.

5. Transformer/rectifier according to claim 4, characterized in that the two opposite limbs are parallel limbs.

6. Transformer/rectifier according to claim 4, characterized in that the two opposite limbs are linked by two return limbs which are each bordered by at least one metal heat-exchange plate, the rim of each of the heat exchange plates being contained in the plane formed simultaneously by the surface of the receiving substrate, the respective metallized bearing rims of the secondary pancake coils, and the interface plate of the primary winding.

7. Transformer/rectifier according to claim 1, characterized in that a former, or "trough", which surrounds one of the plurality of limbs of the magnetic circuit and around which the associated secondary winding is coiled, is formed on or fixed to each support plate, and in that each support plate includes a lateral part extending to the exterior which receives the rectifier circuit associated with this secondary winding together with its connection facility.

8. Transformer/rectifier according to claim 7, characterized in that the primary winding and all the secondary windings are respectively wound around two opposite limbs of the magnetic circuit.

9. Transformer/rectifier according to claim 7, characterized in that the primary winding, which is arranged on a separate limb of the magnetic circuit, is attached to an interface plate made of an electrically insulating material which is a good thermal conductor, this interface plate comprising two metallized electrodes for electrical connection of the two ends of the winding and itself being attached via the rim, itself also metallized according to the connection facility, to the receiving substrate.

* * * * *